No. 756,576. PATENTED APR. 5, 1904.
E. N. CAMP.
CULTIVATOR ATTACHMENT.
APPLICATION FILED JULY 3, 1903.
NO MODEL.

No. 756,576. Patented April 5, 1904.

UNITED STATES PATENT OFFICE.

EDMOND N. CAMP, OF MORELAND, GEORGIA.

CULTIVATOR ATTACHMENT.

SPECIFICATION forming part of Letters Patent No. 756,576, dated April 5, 1904.

Application filed July 3, 1903. Serial No. 164,162. (No model.)

*To all whom it may concern:*

Be it known that I, EDMOND N. CAMP, a citizen of the United States, residing at Moreland, in the county of Coweta and State of Georgia, have invented new and useful Improvements in Cultivator Attachments, of which the following is a specification.

This invention relates to a fender for a cultivator or plow; and the object of the same is to provide a simple and effective form of guard or shield adjustably carried in connection with a cultivator or plow beam and projecting outwardly in close contact with the ground to one side of the plow to prevent soil or trash that may be overturned by the plow from falling upon small plants, and thereby avoid injury to the latter during cultivating operations.

The invention consists in the construction and arrangement of the several parts, which will be more fully hereinafter described and claimed.

Figure 1:
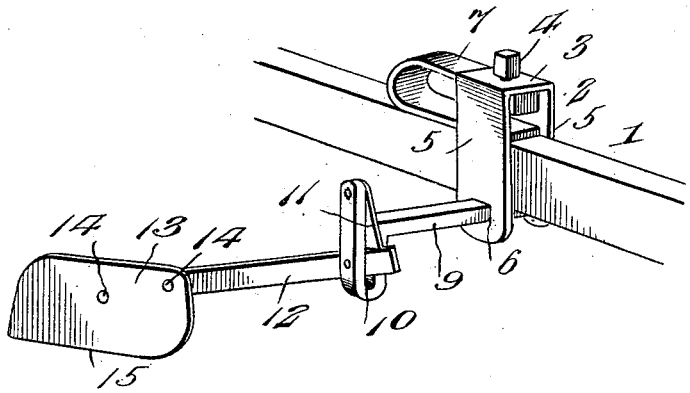
Figure 2:
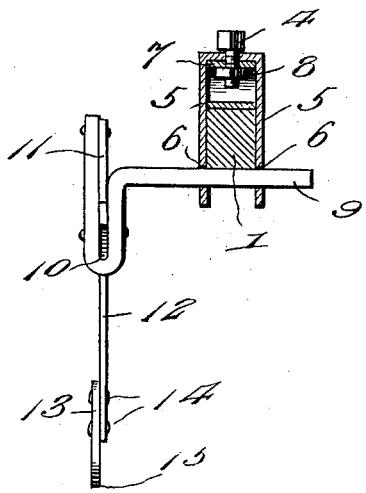

In the drawings, Figure 1 is a perspective view of a portion of a cultivator or plow beam, showing the improved fender attachment applied thereto. Fig. 2 is a transverse vertical section through a part of the plow-beam and attachment, showing the remaining portion of the latter in rear elevation.

Similar numerals of reference are employed to indicate corresponding parts in the views.

The numeral 1 designates the beam of a cultivator or plow, on which is adjustably and removably applied a U-shaped clip 2, having elongated side arms embracing the opposite portions of the beam and depending from a top plate 3, in which an adjusting-screw 4 is mounted, and provided with an angular head for convenience in engaging the same. The side members 5 of the clip depend below the lower edge of the plow and have angular openings 6 therein, which are transversely alined. The one end of a U-shaped spring 7 is secured to adjusting-screw 4 by a nut 8 on the latter, and the lower opposite extremity of said spring loosely bears on the upper edge of the beam 1 when the clip is applied to the latter. Adjustably mounted in the openings 6 of the side members 5 of the clip is an angular supporting-bar 9, which is bent downwardly and then upwardly to form a fulcrum-seat 10. The upper terminal of the fulcrum-seat rises above the upper edge of the bar 9, and pivoted thereto and movable in the seat is a holding-latch 11. Pivotally mounted in the lower portion of the seat is the one extremity of a shank 12, having a fender plate or guard 13 rigidly attached to the opposite extremity by means of rivets or other suitable fastenings 14. This plate or guard has a lower straight edge 15, which is adapted to bear closely against the ground-surface.

The supporting-bar 9, movably carrying the fender plate or guard 13, is adjustable transversely in relation to the beam 1 in the openings 6 of the side members 5 of the clip to adapt the attachment for operation in relation to rows of plants which may vary in distances apart, and to hold the bar 9 against movement it is forced against the under side of the beam 1 with considerable pressure by the spring 7, the tension on the spring being varied by the adjustment of the screw 4.

When the attachment has been applied and adjusted laterally to bring the fender plate or guard 13 in protective proximity to small plants at one side of the plow, the holding-latch 11 is thrown down to cause the lower end thereof to engage the upper edge of the shank 12 within the seat 10 to prevent the fender plate or guard from depressing below the ground-surface. The shank 12 and its fender-plate are free to move upwardly in riding over the ground and passing obstructions or irregularities, and it is proposed to make the plate high enough to prevent dirt or trash from being thrown over on the plant or plants shielded by the plate during the forward movement of the plow.

The improved fender attachment is adapted to be applied to any cultivator or plow beam now in use, and in view of the simplicity of construction of the several parts the cost of manufacture is reduced to a minimum. It is preferred to form all the parts of metal to render them strong and durable, and at times when it is not desired to use the attachment it can be readily disconnected from the beam. Also the latch may be disconnected from the upper edge of the shank, and the latter, with its fender-plate, may be thrown over or held elevated.

Changes in the proportions, dimensions, and minor details may be resorted to without in the least departing from the spirit of the invention.

Having thus fully described the invention, what is claimed as new is—

1. A fender attachment for a plow, consisting of a clip having an upper tension-spring, and openings in the lower extremities thereof, a support adjustably mounted in the said openings and arranged at an angle to the clip, the said support having an outer fulcrum-seat, and a fender-plate having a shank pivotally mounted in the said seat and arranged at an angle to the said support, the support holding the fender-plate and its shank outwardly a distance from the clip.

2. A fender attachment of the class set forth, consisting of a clip having an adjustable spring held in the upper portion thereof, a supporting-bar adjustably carried in the lower extremities of the clip and projecting laterally therefrom, the bar having a fulcrum-seat at its outer terminal, a holding-latch depending in the said seat, and a fender-plate having a shank pivotally mounted in the seat below the latch.

3. In a fender attachment, the combination with a beam, of a clip fitted thereover and having a spring in the upper portion thereof bearing upon the beam, and openings in the lower extremities of the same, a transversely-extending supporting-bar adjustably held in the said openings against the under edge of the beam and provided with an outer fulcrum-seat, a pivoted latch depending into the said seat, and a fender-plate having a shank pivotally held in the lower part of the seat and free to move in an upward direction.

In testimony whereof I affix my signature in presence of two witnesses.

EDMOND N. CAMP.

Witnesses:
J. A. CAMP,
J. R. SPRATLING.